United States Patent Office 3,637,723
Patented Jan. 25, 1972

3,637,723
**CERTAIN BIS(HYDROXYPHENYL)-
1,3,4-THIADIAZOLES**
William H. Meek, Northfield, Ohio, assignor to Ferro
Corporation, Cleveland, Ohio
No Drawing. Filed Aug. 21, 1969, Ser. No. 852,084
Int. Cl. C07d 91/62
U.S. Cl. 260—302 D                     2 Claims

ABSTRACT OF THE DISCLOSURE

Novel 2,5-disubstituted-1,3,4-thiadiazoles of the formula:

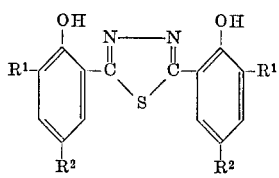

wherein $R^1$ and $R^2$ can be hydrogen, tertiary alkyl of from 4 to 8 carbon atoms inclusive, and primary or secondary alkyl of from 1 to 10 carbon atoms, providing that at least one of $R^1$ and $R^2$ is a tertiary alkyl. The compounds are useful as bacteriostats.

---

This invention relates to thiadiazoles and more particularly to 2,5-disubstituted-1,3,4-thiadiazoles of the formula:

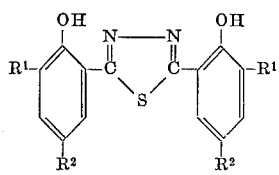

wherein the groups represented by $R^1$ and $R^2$ are independently selected from hydrogen, tertiary alkyl of from 4 to 8 carbon atoms inclusive, and primary or secondary alkyl of from 1 to 10 carbon atoms providing that at least one of $R^1$ and $R^2$ is a tertiary alkyl.

The compounds can be prepared by reacting hydrazine (preferably the hydrate) and a hydroxy aromatic dithiocarboxylic acid or its alkyl ester according to the following reaction diagram wherein $R^1$ and $R^2$ are as previously defined and $R^3$ is an alkyl of from 1 to 10 carbon atoms or H.

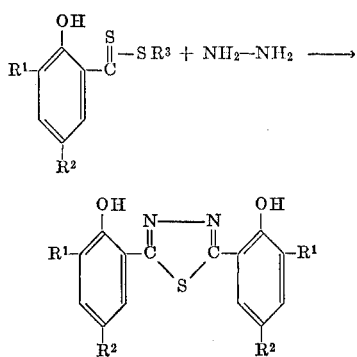

The reaction can be conveniently conducted at atmospheric pressure at a temperature between about 100 and about 150° C. in a period between about 2 and about 10 hours. After the reaction is complete as evidenced by the cessation of hydrogen sulfide and methyl mercaptan evolution, the product can be recovered by conventional means such as recrystallization from an N,N-dialkylamide solvent. Suitable solvents include N,N-dimethylformamide and dimethylacetamide.

The compounds are useful as bactericides.

The following examples illustrate the invention and its preferred embodiments.

EXAMPLE 1

Preparation of 2,5-bis(3,5-ditert.-butyl-2-hydroxyphenyl)-1,3,4-thiadiazole

Into a 500 ml. reaction flask fitted with a thermometer, stirrer and reflux condenser were added 29.6 grams of methyl 3,5-ditert.-butyl-dithiosalicylate (0.1 mole), 30 grams of hydrazine hydrate (54% $N_2H_4$, 0.05 mole) and 150 ml. of dimethylformamide, and the mixture was heated at reflux temperature for three hours until the evolution of methylmercaptan subsided. The solution was cooled to room temperature by means of an ice bath and the resultant white crystals were filtered, washed with methanol and dried to produce 19.5 grams of product (79.0% yield); M.P. 258° C.; 6.43% S (found), 6.5 (calculated).

EXAMPLE 2

Preparation of 2,5-bis(3-tert.-butyl-2-hydroxy-5-methylphenyl)1,3,4-thiadiazole

In accordance with the procedure of Example 1, methyl 3-tert.-butyl-5-methyldithiosalicylate was heated with hydrazine hydrate in equimolar amounts at about 110° C. for about 3 hours. The mixture was cooled and the solids recrystallized from dimethylformamide to recover the product in 41.2% yield; M.P. 282–5° C., 6.69% N (found) 6.83 (calculated); 7.76% S (found) 7.80 (calculated).

EXAMPLE 3

Preparation of 2,5-bis(2-hydroxy-5-tert.-octylphenyl)-1,3,4-thiadiazole

In accordance with the procedure of Example 1, methyl 5-tert.-octyldithiosalicylate was heated with hydrazine hydrate to produce the subject product in 54% yield.

In order to test for their effect on bacteria the thiadiazoles of the invention are incorporated in nutrient agar to various dilutions. Stock solutions of 1% are prepared in isopropyl alcohol. The bacteria cultures are streaked over the surface of the agar. The bacterial plates are incubated at 37° C. for 48 hours and then observed for the presence of growth or no growth. The compound 2,5-bis(2-hydroxy-5-tert.-octylphenyl) - 1,3,4 - thiadiazole inhibits the growth of *Pseudomonas aeruginosa* at 200 p.p.m.

The compounds 2,5 - bis(3,5-ditert.-butyl-2-hydroxyphenyl)-1,3,4-thiadiazole and 2,5-bis(3-tert.-butyl-2-hydroxy-5-methylphenyl)-1,3,4-thiadiazole are both effective at 0.1% in nutrient agar cultures, in inhibiting the growth of *Escherichia coli* and *Pseudomonas aeruginosa*.

What is claimed is:
1. 2,5-bis(3-tert.-butyl-2-hydroxy - 5 - methylphenyl)-1,3,4-thiadiazole.
2. 2,5-bis(2-hydroxy - 5 - tert.-octylphenyl)-1,3,4-thiadiazole.

References Cited

Elderfield, Heterocyclic Compounds, vol. 7, Wiley, N.Y., 1961, p. 605.
Gompper et al., Chem. Abstracts, 63:8356 (1965).

ALEX MAZEL, Primary Examiner
R. J. GALLAGHER, Assistant Examiner

U.S. Cl. X.R.
260—455 C, 502.6; 424—270